US008645244B2

(12) United States Patent
Fanous et al.

(10) Patent No.: US 8,645,244 B2
(45) Date of Patent: *Feb. 4, 2014

(54) CAPITAL ALLOCATION AND RISK MANAGEMENT

(75) Inventors: Maged George Fanous, Surrey (GB); Mark Jason Turner, Essex (GB)

(73) Assignee: Accenture Global Services Limited, Dublin (IE)

( * ) Notice: Subject to any disclaimer, the term of this patent is extended or adjusted under 35 U.S.C. 154(b) by 331 days.

This patent is subject to a terminal disclaimer.

(21) Appl. No.: 12/493,844

(22) Filed: Jun. 29, 2009

(65) Prior Publication Data

US 2009/0281936 A1 Nov. 12, 2009

Related U.S. Application Data

(63) Continuation of application No. 10/793,016, filed on Mar. 4, 2004, now Pat. No. 7,574,387.

(51) Int. Cl.
*G06Q 40/00* (2012.01)
*G06Q 10/10* (2012.01)
*G06Q 20/10* (2012.01)

(52) U.S. Cl.
CPC .............. *G06Q 40/00* (2013.01); *G06Q 10/10* (2013.01); *G06Q 20/108* (2013.01); *G06Q 40/10* (2013.01)
USPC .................................. 705/35; 705/30; 705/38

(58) Field of Classification Search
CPC ....... G06Q 40/10; G06Q 40/00; G06Q 10/10; G06Q 20/108
USPC ........................................... 705/1, 35, 38, 30
See application file for complete search history.

(56) References Cited

U.S. PATENT DOCUMENTS 6,078,905 A * 6/2000 Pich-LeWinter ........... 705/36 R
6,993,505 B1 1/2006 Katz et al.
(Continued)

FOREIGN PATENT DOCUMENTS

WO WO 02/080435 A2 * 10/2002

OTHER PUBLICATIONS

Sollenberger, Harold and Ballou, Brian; "A FASB Statement No. 107 report card"; CPA Journal, V64, n10; Oct. 1994; pp. 1-8.*
Olson, Ronald L.; "Without risk benchmarks, risk measures don't make sense"; Bank Accounting & Finance; v10, n4; Summer 1997; pp. 1-8.*
"PeopleSoft to Deliver New Risk Management Solutions to Address Basel II Accord; Advanced Capabilities to Enable Banks to Develop a Complete View of Risk Across the Enterprise," Business Wire (Oct. 22, 2002), p. 1.
(Continued)

*Primary Examiner* — Ella Colbert
(74) *Attorney, Agent, or Firm* — Fish & Richardson P.C.

(57) ABSTRACT

In an approach to financial management, a data representation is formed that defines a number of data elements and relationships between the data elements according to one or more regulatory requirements. Data characterizing availability of particular ones of the data elements for a financial institution are accepted, and actual or potential compliance by the financial institution with at least some of the regulatory requirements is then analyzed. The analysis can include identifying gaps in collection of values associated with the data elements for the regulator requirements, which can relate to calculation requirements and/or to reporting requirements for the regulations. Data representing computations associated with the regulatory requirements can be stored and the computations can then be executed to validate other implementations of the calculation.

30 Claims, 5 Drawing Sheets

(56) References Cited

U.S. PATENT DOCUMENTS

| | | |
|---|---|---|
| 7,263,503 B1 * | 8/2007 | Phibbs, Jr. .................. 705/35 |
| 7,409,357 B2 | 8/2008 | Schaf et al. |
| 2002/0138449 A1 | 9/2002 | Kendall et al. |
| 2003/0023543 A1 | 1/2003 | Gunewardena et al. |
| 2003/0149657 A1 | 8/2003 | Reynolds et al. |
| 2003/0185363 A1 | 10/2003 | Cerami et al. |
| 2003/0225659 A1 | 12/2003 | Breeden et al. |
| 2004/0111346 A1 | 6/2004 | Macbeath et al. |
| 2004/0167793 A1 | 8/2004 | Masuoka et al. |
| 2004/0177016 A1 | 9/2004 | Jones et al. |
| 2004/0267660 A1 | 12/2004 | Greenwood et al. |
| 2005/0004854 A1 | 1/2005 | Jones et al. |
| 2005/0021435 A1 | 1/2005 | Hakanoglu et al. |
| 2005/0108080 A1 | 5/2005 | Peterson |
| 2005/0177510 A1 | 8/2005 | Hilt et al. |
| 2009/0281936 A1 * | 11/2009 | Fanous et al. .................. 705/30 |

OTHER PUBLICATIONS

Consultative Document: The New Basel Capital Accord; Bank for International Settlements (Jul. 31, 2003).(226 pages).

"Loss Data; Statistical/Actuarial Approaches to Operational Risk Capital," Operational Risk (Dec. 2000), p. 14-17.

"Bank Capital Requirements," http://web.archive.org/web/20030206081940/http://wfhummel.cnchost.com/capitalrequirements.html (Feb. 6, 2003).

* cited by examiner

CAPITAL ALLOCATION AND RISK MANAGEMENT

CROSS REFERENCE TO RELATED APPLICATION

This application is a continuation of U.S. application Ser. No. 10/793,016, filed Mar. 4, 2004, which is incorporated herein by reference.

BACKGROUND

This invention relates to financial management, and more particularly to capital allocation and risk management.

Banks (or other types of financial institutions) typically maintain capital reserves to offset risks related to credit extended by those banks. The amount of capital maintained by the bank is based on a number of factors related to the credit, such as the risk of default of loans by the bank. Based on measures of a bank's credit portfolio related to the degree of risk of the portfolio, the bank needs to set aside a certain percentage of its credit exposure to protect against bad debt. For example, a bank may know that based on historical experience 10% of its portfolio will likely default on its credit. Failure to adequately offset credit exposure with capital reserves can lead to liquidation of the bank if enough of the credit is subject to default.

The Basel Committee on Banking Supervision has published accords that provide guidelines for retail and non-retail banks. Most recently, the Committee published a consultation paper titled the Basel II Capital Accord (Basel II). Basel II is a compliance regulation that provides for risk sensitive approaches to capital allocation, which is a core part of financial reporting by banks. Basel II also addresses the management of a bank's risk portfolio to ensure that it has a risk sensitive approach to understanding the provisions they need to take to offset bad debt. There are three aspects to the risk. One is market risk; one is credit risk; and one is operational risk. Basel II focuses primarily on operational risk and credit risk. In part, Basel II attempts to improve the measurements of risk within the banking system. In particular, the accord establishes new guidelines for computing the capital requirements maintained by banks to offset credit they have extended. The accord also addresses banks' internal control and management.

Basel II provides for a number of different acceptable approaches to computing quantities such as weighted credit risks, which form the basis of the computed capital requirements. Some of these approaches are complex, making it difficult to implement compliant procedures in accordance with the accord. Furthermore, although Basel II is an extensive document, not all of the requirements and not all the interrelationships of the requirements are explicit. The Basel II requirements are relatively complex and may be difficult for a bank to implement.

SUMMARY

In one aspect, in general, the invention features a method and associated software and system that make use of a data representation that defines a number of data elements and relationships between the data elements according to one or more regulatory requirements, such as regulatory requirements governing financial institutions.

Aspects of the invention can include one or more of the following features:

Data characterizing availability of particular ones of the data elements for a financial institution are accepted, and actual or potential compliance by the financial institution with at least some of the regulatory requirements then analyzed.

The regulatory requirements can include capital allocation requirements and/or requirements specified by the Basel Committee on Banking Supervision.

The financial institution can include a retail or a non-retail bank.

Analyzing actual or potential compliance can include identifying gaps in collection of values associated with the data elements based on the accepted data characterizing availability of particular ones of the data elements and on data requirements for the regulator requirements. The gaps can relate to calculation and/or to reporting requirements for the regulations.

Data representing computations associated with the regulatory requirements can be stored. One (or more) of the computations can then be executed to validate another implementation of the calculation.

The data representation that defines the data elements and relationships between the data elements can be formed by processing a regulation specification, for example, by processing the Basel II Capital Accord. The regulation specification can take the form of a textual specification, which may require manual analysis and interpretation.

Processing the regulation specification can include inferring implicit relationships between data elements, which may not be found explicitly in the specification. The processing may also include identifying relationships between data elements and specific provisions of the regulation specification. The processing may also includes identifying relationships between data elements and representations of industry knowledge, for example, that are derived from experience in delivery of large-scale systems.

Aspects of the invention can have one or more of the following advantages.

Compliance with complex financial regulations can require extensive changes to the operating procedures within a financial institution. Explicitly modeling the data elements required for various requirements in a financial regulation can support automated diagnostic and validation tools that reduce the effort required to identify and make the required changes. In the case of Basel II, the regulations are particularly extensive and therefore use of such automated diagnostic and validation tools may provide significant savings in implementing the regulations.

The approach can reduce the time and/or effort required to gather data and perform gap analysis, for example, by using a comprehensive benchmark of the data needed to achieve Basel II compliance.

Other features and advantages of the invention are apparent from the following description, and from the claims.

DESCRIPTION

Figure 1:
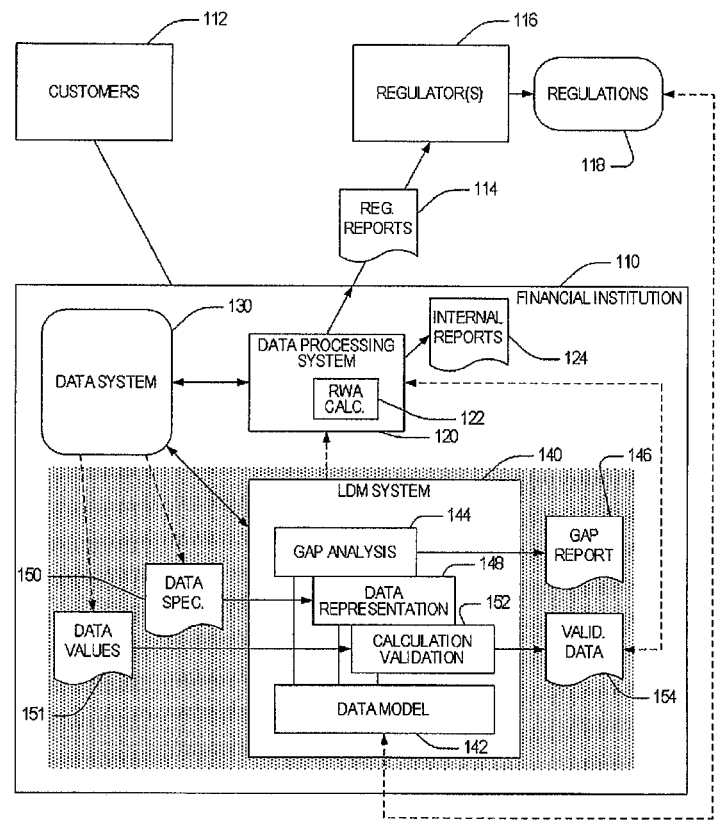
FIG. 1 is a block diagram of a financial system.

Referring to FIG. 1, a financial institution 110, such as a commercial or retail bank, conducts business with a number of customers 112 and is regulated by one or more regulators 116. One type of business conducted by the institution is the extending of credit to its customers. As an example, the financial institution may be regulated by a national government agency, which requires the financial institution to provide regular regulatory reports 114. The regulators 116 issue regulations 118 according to which the financial institution 110 must operate. For example, the regulations may relate to the management of risks related to the extending of credit to the customers.

One aspect of management of risk related to the extending of credit to customers involves the capital reserves that are used by the institution to offset possible losses related to default by the customers. One basic approach to calculation of the required credit reserves is to assign a risk factor to different classes of extended credit, and to accumulate a total "risked weighted assets" (RWA) by summing the product of the amount of credit in each class and its risk factor (e.g., 100% for an unsecured loan, 50% for real estate loans, 0% for a government-backed bond). The capital requirement is then a percentage of the computed RWA, for example 8% of the RWA.

Internally, the financial institution 110 maintains a data system 130, which holds data related to the its operations and relationships with its customers, and a data processing system 120, which is used to process information in the data system. Among the many different types of information processing, the data processing system 120 performs a "risk weighted assets" (RWA) calculation. The data processing system 120 is also used to produce internal reports 124 for use in management of the financial institution, as well as regulatory reports 114, which are made public and/or provided to regulators 116.

The Basel II Capital Accord is an example of the regulations 118, or the basis of more specific regulations, according to which the financial institution operates. The requirements of Basel II are split into three parts, referred to as the three "pillars" of the Accord. Pillar I, Capital Charge Calculation, relates to acceptable ways of computing capital reserves. Pillar II, Supervisory, relates to the information required for the decision making with the organization. Pillar III, Reporting, relates to the information required for reporting to regulatory organizations or within the organization. Basel II also allows for different methodologies for performing calculations within each of the pillars. The first level involves a "standardized" calculation in which the regulators supply generic parameters, such as an industry-standard probability of default and the percentage of RWA required to the held in a capital reserve. The Accord also provides for two methodologies that are more complex: an "internal ratings" based approach, and an "advanced" approach that is based on detail historical analysis.

A financial institution may prefer to use the more complex methodologies, for example, because they result in a less conservative capital reserve requirement that is more sensitive to the details of the risks associated with the credit it has extended to its customers. However, the more complex methodologies require recording of data and performing of calculations that may not be necessary for the standardized or more basic approaches, and therefore an institution seeking to make use of the more complex methodologies may face relatively complicated modification of its internal record keeping and data analysis. This difficulty may be exasperated by the operation of the institution in a number of relatively separate or independent business units, as certain requirements relate to the institution as a whole rather than to specific business units, and relatively high credit risk related to one business unit may be offset by low credit risk or high capital reserves in another business unit.

Referring still to FIG. 1, the financial institution 110 makes use of an LDM system 140 to analyze its compliance or possibility of compliance with regulations 118, such as compliance with Basel II. (Note that the use of the term "LDM," which is an acronym for "Logical Data Model," in the name "LDM system" generally relates to the use of an explicit data model 142 within LDM system 140 and is not intended to imply any particular characteristics of the system.) The data model 142 explicitly represents various data elements and relationships between the data elements and between the data elements and specific provisions of the regulations 118.

In the discussion below, regulations 118 include the provisions of Basel II. These provisions, which span a number of separate publications, have been manually analyzed and interpreted to determine the requirements of the provisions in terms of the overall spirit of the regulation and the types of data that would be required to meet the requirements (or even the spirit of the requirements if their are not explicit). Note that the Basel II regulations are not always explicit in terms of what data is required, and therefore is subject to interpretation. A result of the analysis and interpretations is the data model 142, which explicitly identifies the various data elements that may be implicitly or explicitly required to support computations required by the accord. The relationship between the regulations 118 and the data model 142 is indicated in the figure by a dotted arrow A.

The data model is comprehensive in that, based on the analysis and interpretation of the accord, the model identifies all the data elements that may be required for different calculations related to the Accord. That is, any particular financial institution may not necessarily be required to perform all the different calculations and therefore may not make use of the entire data model. Each element in the data model 142 includes a number of pieces of information about the element, which can include the meaning (semantics) of the element, its relationship to particular sections of the regulations, and textual documentation related to the use of the element. The elements relate, for example, to transactions, counterparties, and collateral. The LDM is further customizable to suit specific reporting or other requirements of the financial institution.

The LDM system 140 includes a number of components that are all based in some way on the data model 142. These components include a data representation 148, and components that involve data processing: a gap analysis 144 and a calculation validation 152.

The data representation 148 includes information about the data available in the institution's data system 130 that may be useful for calculations required by the regulations. That is, the data representation does not itself include the values of the data, but rather it identifies what information is recorded by the financial institution, and where in the data system 130 (e.g., in which database systems, in which tables and which fields, within which business unit, etc.) the data is stored. This data representation allows a user associated with the financial institution to capture physical data definitions across the various parts of the institution to ensure all definitions are consistent and suitable for all different instances where data is referenced or stored within the system.

The gap analysis component 144 is a diagnostic tool that uses the information in the data representation 148 and the information in the data model 142 to identify the additional data that must be provided in order to support particular computation or reporting requirements of the regulations. For the Basel II regulations, the LDM system 140 supports the different levels of sophistication permitted by the accord. One use of the gap analysis is to identify the data that would be required in order for the institution to be able to perform the calculations and reports required by more advanced levels. The use of the advanced levels may be advantageous to the institution for example by reducing the total capital allocation required to offset its credit exposure. An output of the gap analysis 144 is a gap report 146, which identifies the information that is required in order to support various requirements of the regulations. It may be that the required information is already being recorded in the data system 130 of the institution. After the required information is added to the data specification 150, which is provided to the data representation component 148 of the LDM system 140, a new gap report 146 can be generated showing that the required information is available. Each data element description has provided with it an associated business and technical descriptions (somewhat like a dictionary definition) to assist with learning and application or the Accord.

The gap analysis component 144 can provide in the gap reports 146 a specific list of data elements that need to be provided. For a financial institution that has separate business units, a separate gap report can be generated for each specific business unit identifying the data that needs to be provided by that business unit. The gap report can also identify what data elements are currently being collected, and where the gaps are to meet a desired level of calculation.

The gap analysis 144 also identifies reporting system gaps in the institution's reporting procedures. For example, the regulations may require reporting the value or liquidity of collateral, and the gap analysis can identify if certain data is not recorded that would be needed to satisfy the reporting requirements. A specific example relates to the type of collateral that is encoded using a classification (e.g., Income Producing Real Estate, Gold, Cash, bonds) that does not provide sufficient distinctions in type of collateral. In that case, the gap analysis may identify that a more fine-grained classification of collateral is needed.

The calculation validation component 152 implements calculations implicitly or explicitly specified by the regulations 118. Note that the LDM system 140 does not generally have the computation capacity (e.g., computation speed and/or data handling capacity) to perform all of the computations for the institution required by the regulations. Such calculations are performed in the institution's data reporting system 120. However, implementation of the calculations may not be straightforward. For example, the computation may be incorrectly implemented, or they may be based on incorrect elements in the data system. Therefore, the calculation validation component 152 of the LDM system 140 provides a previously validated implementation (i.e., a reference implementation) of the required calculations. The calculation validation relies on data values 151 retrieved from the data system 130. This retrieval may be automated based on the information in the data representation component 148 or may be based on a manual extraction of the data values. The calculation validation produces validation data 154, which can then be compared to the results of calculations performed by the data processing system 120. If the results differ, then an error in the implementation in the data processing system 120 is likely.

Figure 2:
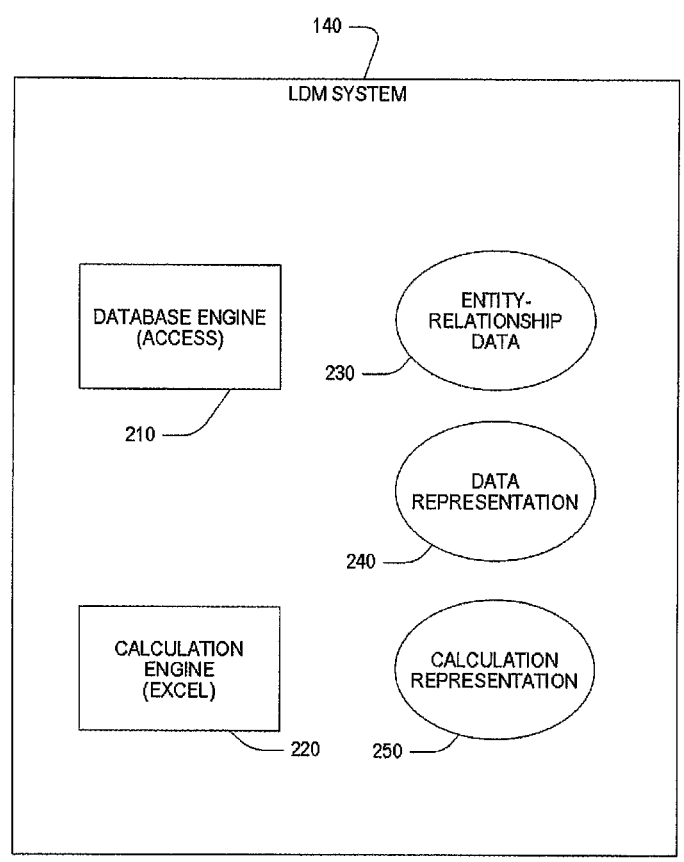
FIG. 2 is a block diagram of a data model system.

Referring to FIG. 2, internally the LDM system 140 makes use of a database engine 210, which includes a Microsoft Access® relational database management system (DBMS). This database engine is used to access entity-relationship data 230, which is used to store the information for the data model 142. The database engine is also used to access the data representation information 240 used by the data representation component 148. The LDM system 140 also includes a calculation engine 220, which includes a Microsoft Excel spreadsheet system. The calculations that are preformed by the calculation validation component 152 are encoded in calculation representation data 250, which includes Excel spreadsheets or spreadsheet templates that implement the required calculations.

Figure 3:
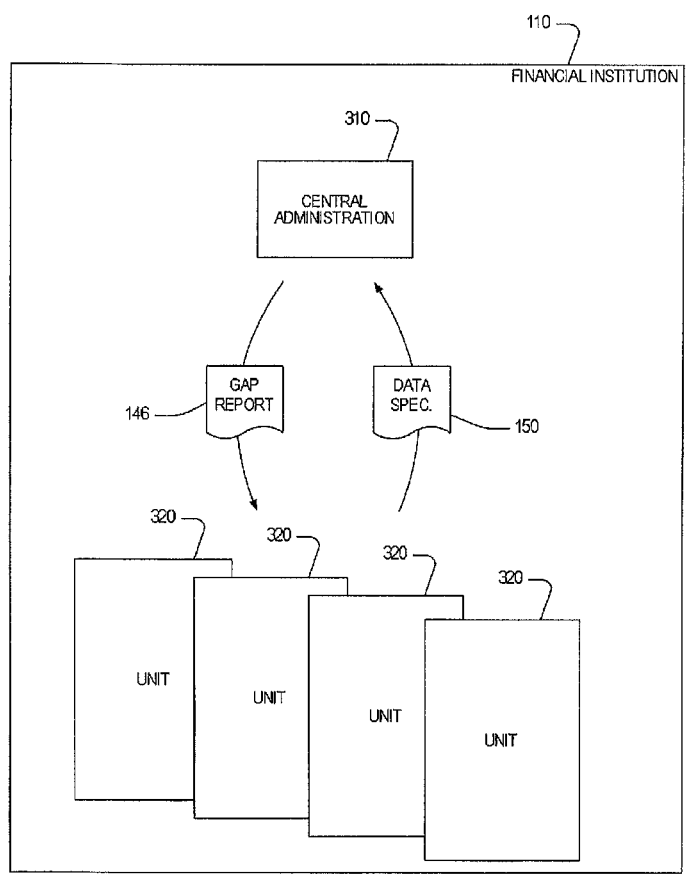
FIG. 3 is a block diagram of a financial institution.

Referring to FIG. 3, the financial institution 110 may be organized with a central administration 310 and a number of separate business units 320. The LDM system 140 can be used to produce separate gap reports 146 for each of the units 320, and in return, each of the units prepares data specifications 150, which are passed back into the LDM system. In this way, the LDM system provide a mechanism for collecting information from the various business units, and identifying for each of the units the additional information that is needed.

Figure 4:
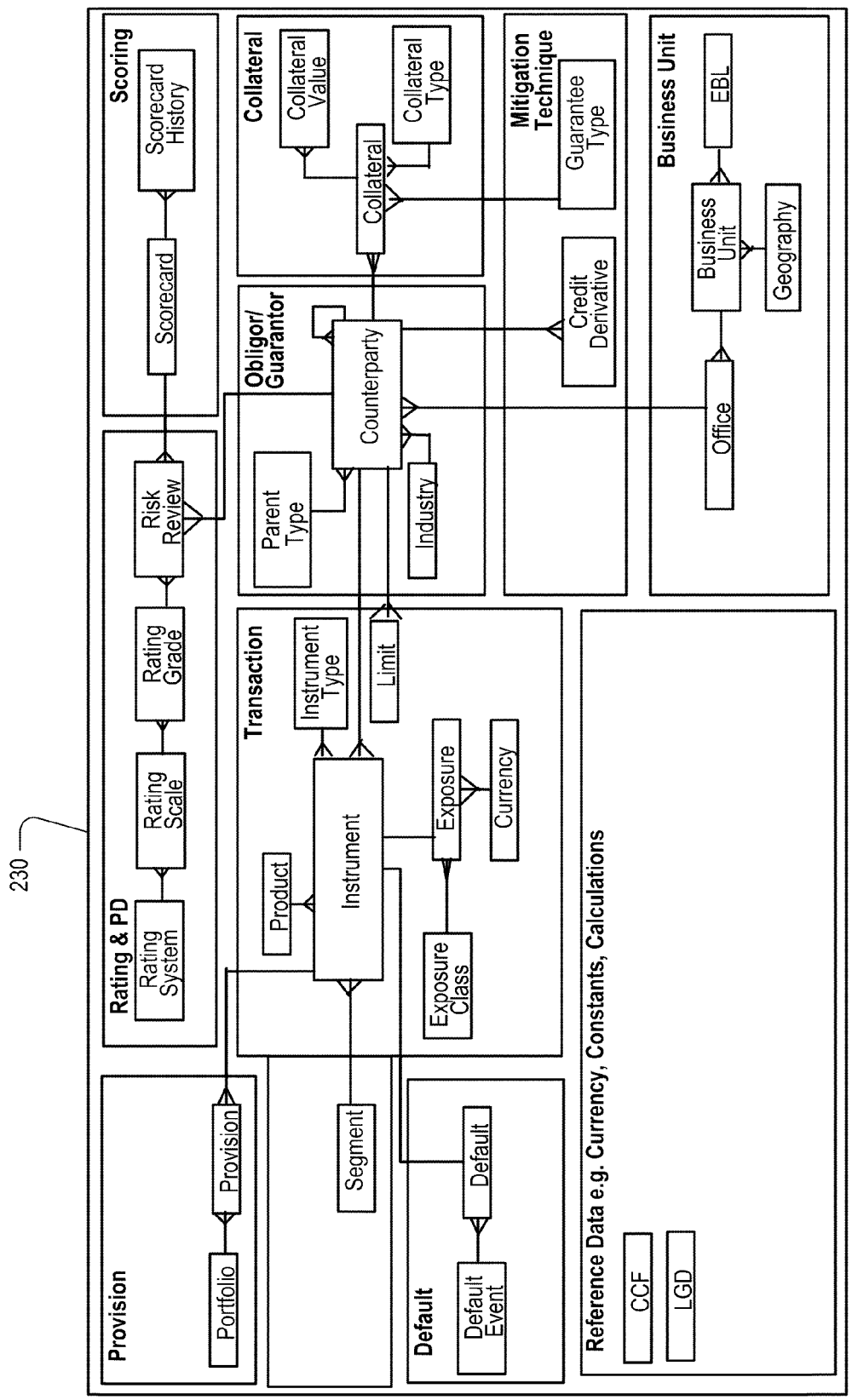
FIG. 4 is a diagram of entity-relationship data.

Referring to FIG. 4, the entity-relationship data 230 (see FIG. 2) includes relatively fine-grain entities. Only a portion of the entity-relationship data 230 for the Basel II version of the LDM system is shown in the figure. There are 36 retail data entities and 48 non-retail data entities. These entities include an exposure class and a rating grade. There are over 210 data elements for retail and 400 non-retail transactions, including collateral type (which may affect its liquidity) and credit derivative. There are over 70 relationships between entities or data elements. For example, a facility ID may be related to an attribute "in default" or can be related to a geographic location of the facility. As shown in the figure, a particular instrument is associated with an instrument type and an exposure, and the exposure is associated with a currency of that exposure.

Figure 5:
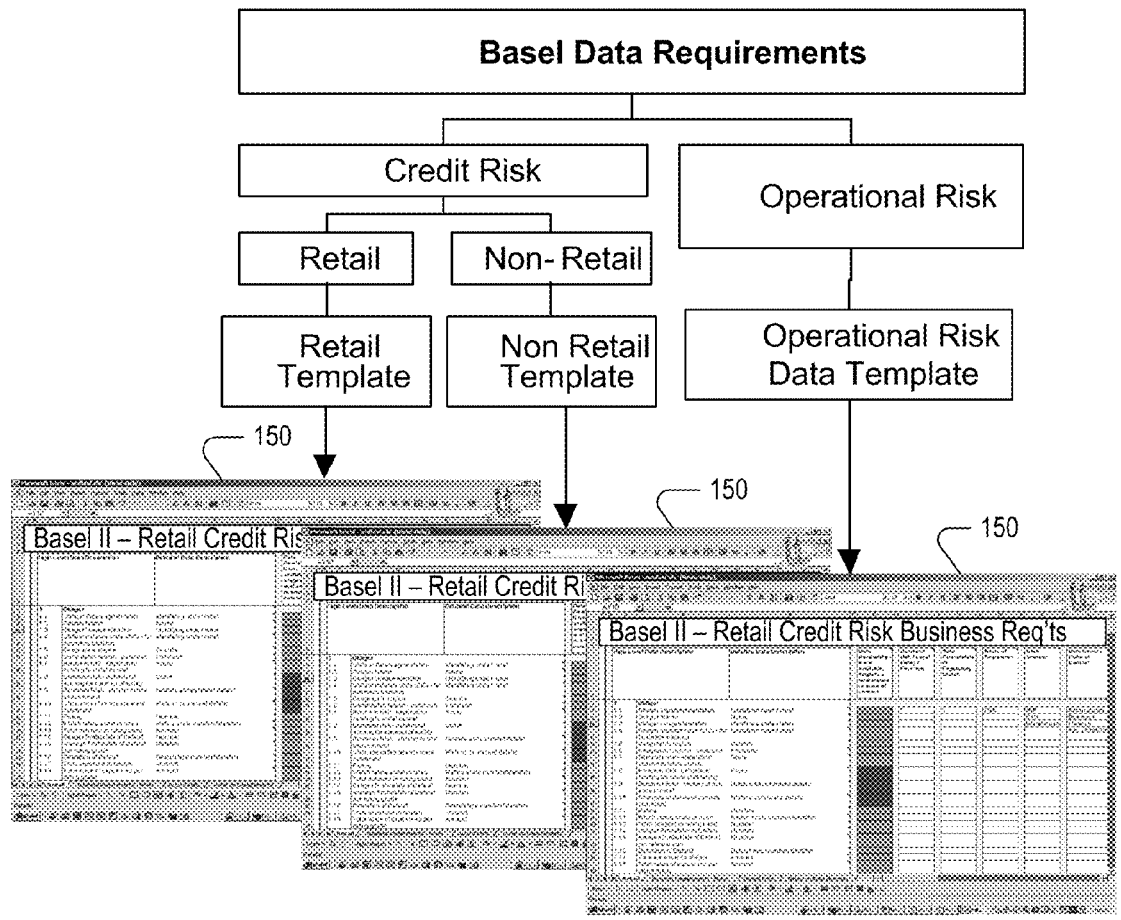
FIG. 5 is a diagram of requirements templates.

Referring to FIG. 5, the LDM system 140 generates templates of the information related to credit and operational risk that is needed for various types of retail or non-retail transactions. The completed templates that include specific data values are then used to populate the data system 130, and can be used by the calculation validation component of the LDM system. These Microsoft Excel®-based templates are used to confirm the availability of the necessary data items with various business units of the financial institution. The LDM system dynamically generates these templates to support the data collection process. The templates are sent to appropriate business units to identify the necessary information technology changes that are needed to institute collection and storage (e.g., for historical analysis) of the required data.

The LDM system 140 may be hosted on a variety of different computation platforms. In one implementation, the system is hosted on a Microsoft Access® platform (i.e., a computation platform that hosts a Microsoft Access database system). This implementation can be ported to other computation platforms, which for not necessarily support Microsoft Access, and which may not necessarily support any particular form of database system. The system may be implemented in software stored on a computer readable medium associated with a general-purpose computer. The instructions can be for separate applications, or can be used to augment (e.g., as plug-ins for) existing software applications. The system may also be implemented in a distributed architecture, for example, with some components being hosted on different computers that other components.

Although aspects of the system are described above with reference to the Basel II Capital Accord, the approach is more general and is not limited to such specific regulations. Nor is the approach limited to regulation of financial institutions. For example, accounting regulations that are applied to corporations in general could be supported by a system of the general structure of the LDM system. As another example, it is possible to customize the LDM to support client specific data elements and contexts, for example, to reflect levels of granularity in the organization structure of the institution.

In other embodiments, not all of the capabilities of the LDM system 140 are required to co-exist in a single system. For example, only one of the gap analysis or the computation validation components could be used without both being implemented.

In the approach described above, the requirements of Basel II were analyzed and interpreted manually. In general, depending on the form of the regulations, some or all of this step may be automated to form the data model. For example, future regulations may provide some or all of the information needed for the data model in a form suitable for automated processing.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
    identifying, by one or more computers, data elements that are classified by a data model as data elements that are required to perform one or more accepted calculations for determining a financial institution's capital reserve requirement;
    identifying, by the one or more computers and based on an analysis of the financial institution's data system, one or more of the data elements that are classified by the data model as data elements that are required to perform the accepted calculations for determining the financial institution's capital reserve requirement, that are not explicitly recorded in the financial institution's data system; and
    generating, by the one or more computers, one or more gap reports which identify the data elements that are classified by the data model as data elements that are required to perform the accepted calculations for determining the financial institution's capital reserve requirement, that are not explicitly recorded in the financial institution's data system.

2. The method of claim 1, further comprising:
    identifying, for each of the one or more data elements which are not explicitly recorded in the financial institution's data system, a business unit of the financial institution which is responsible for the respective data element.

3. The method of claim 2, wherein generating the one or more gap reports further comprises generating a single gap report for the financial institution which further identifies the business unit which is responsible for each respective data element.

4. The method of claim 2, wherein generating the one or more gap reports further comprises generating a gap report for each identified business unit of the financial institution, each gap report identifying the one or more data elements for which the respective business unit is responsible.

5. The method of claim 4, wherein each identified business unit of the financial institution prepares data specifications that include the identification of additional information needed by the data model from the respective business unit based on the gap report for the business unit.

6. The method of claim 1, further comprising:
    determining, after generating the gap report, that the one or more of the data elements have been explicitly recorded in the financial institution's data system; and
    responsive to determining that the one or more of the data elements have been explicitly recorded, performing the one or more calculations for determining the financial institution's capital reserve requirement.

7. The method of claim 6, further comprising:
    reducing the financial institution's actual capital reserve based on performing the one or more calculations.

8. The method of claim 1, wherein the one or more accepted calculations further comprise two or more of a Basel II Capital Accord standardized approach for credit risk or operational risk, a Basel II Capital Accord internal ratings-based approach, and a Basel II Capital Accord Advanced Measurement approach (AMA).

9. The method of claim 1, wherein identifying the data elements that are classified by a data model as data elements that are required to perform the accepted calculations further comprises:
    accessing the data model, wherein a specific data element is designated as a required data element based on a manual analysis of a banking regulation that has determined the specific data element as required in order to satisfy a specific provision of the banking regulation.

10. The method of claim 1, wherein the data model provides information associated with each data element, the information comprising a semantic for the data element, a relationship to a particular section of an operational regulation, and textual documentation related to the use of the data element within the financial institution.

11. A system comprising:
    one or more computers; and
    a computer-readable medium coupled to the one or more computers having instructions stored thereon which, when executed by the one or more computers, cause the one or more computers to perform operations comprising:
        identifying data elements that are classified by a data model as data elements that are required to perform one or more accepted calculations for determining a financial institution's capital reserve requirement,
        identifying, based on an analysis of the financial institution's data system, one or more of the data elements that are classified by the data model as data elements that are required to perform the accepted calculations for determining the financial institution's capital reserve requirement, that are not explicitly recorded in the financial institution's data system, and
        generating one or more gap reports which identify the data elements that are classified by the data model as data elements that are required to perform the accepted calculations for determining the financial institution's capital reserve requirement, that are not explicitly recorded in the financial institution's data system.

12. The system of claim 11, wherein the operations further comprise:
    identifying, for each of the one or more data elements which are not explicitly recorded in the financial institution's data system, a business unit of the financial institution which is responsible for the respective data element.

13. The system of claim 12, wherein generating the one or more gap reports further comprises generating a single gap report for the financial institution which further identifies the business unit which is responsible for each respective data element.

14. The system of claim 12, wherein generating the one or more gap reports further comprises generating a gap report for each identified business unit of the financial institution, each gap report identifying the one or more data elements for which the respective business unit is responsible.

15. The system of claim 14, wherein each identified business unit of the financial institution prepares data specifications that include the identification of additional information needed by the data model from the respective business unit based on the gap report for the business unit.

16. The system of claim 11, wherein the operations further comprise:
determining, after generating the gap report, that the one or more of the data elements have been explicitly recorded in the financial institution's data system; and
responsive to determining that the one or more of the data elements have been explicitly recorded, performing the one or more calculations for determining the financial institution's capital reserve requirement.

17. The system of claim 16, wherein the operations further comprise:
reducing the financial institution's actual capital reserve based on performing the one or more calculations.

18. The system of claim 11, wherein the one or more accepted calculations further comprise two or more of a Basel II Capital Accord standardized approach for credit risk or operational risk, a Basel II Capital Accord internal ratings-based approach, and a Basel II Capital Accord Advanced Measurement approach (AMA).

19. The system of claim 11, wherein identifying the data elements that are classified by a data model as data elements that are required to perform the accepted calculations further comprises:
accessing the data model, wherein a specific data element is designated as a required data element based on a manual analysis of a banking regulation that has determined the specific data element as required in order to satisfy a specific provision of the banking regulation.

20. The system of claim 11, wherein the data model provides information associated with each data element, the information comprising a semantic for the data element, a relationship to a particular section of an operational regulation, and textual documentation related to the use of the data element within the financial institution.

21. A computer storage medium encoded with a computer program, the program comprising instructions that when executed by data processing apparatus cause the data processing apparatus to perform operations comprising:
identifying data elements that are classified by a data model as data elements that are required to perform one or more accepted calculations for determining a financial institution's capital reserve requirement,
identifying, based on an analysis of the financial institution's data system, one or more of the data elements that are classified by the data model as data elements that are required to perform the accepted calculations for determining the financial institution's capital reserve requirement, that are not explicitly recorded in the financial institution's data system, and
generating one or more gap reports which identify the data elements that are classified by the data model as data elements that are required to perform the accepted calculations for determining the financial institution's capital reserve requirement, that are not explicitly recorded in the financial institution's data system.

22. The computer storage medium of claim 21, wherein the operations further comprise:
identifying, for each of the one or more data elements which are not explicitly recorded in the financial institution's data system, a business unit of the financial institution which is responsible for the respective data element.

23. The computer storage medium of claim 22, wherein generating the one or more gap reports further comprises generating a single gap report for the financial institution which further identifies the business unit which is responsible for each respective data element.

24. The computer storage medium of claim 22, wherein generating the one or more gap reports further comprises generating a gap report for each identified business unit of the financial institution, each gap report identifying the one or more data elements for which the respective business unit is responsible.

25. The computer storage medium of claim 24, wherein each identified business unit of the financial institution prepares data specifications that include the identification of additional information needed by the data model from the respective business unit based on the gap report for the business unit.

26. The computer storage medium of claim 21, wherein the operations further comprise:
determining, after generating the gap report, that the one or more of the data elements have been explicitly recorded in the financial institution's data system; and
responsive to determining that the one or more of the data elements have been explicitly recorded, performing the one or more calculations for determining the financial institution's capital reserve requirement.

27. The computer storage medium of claim 26, wherein the operations further comprise:
reducing the financial institution's actual capital reserve based on performing the one or more calculations.

28. The computer storage medium of claim 21, wherein the one or more accepted calculations further comprise two or more of a Basel II Capital Accord standardized approach for credit risk or operational risk, a Basel II Capital Accord internal ratings-based approach, and a Basel II Capital Accord Advanced Measurement approach (AMA).

29. The computer storage medium of claim 21, wherein identifying the data elements that are classified by a data model as data elements that are required to perform the accepted calculations further comprises:
accessing the data model, wherein a specific data element is designated as a required data element based on a manual analysis of a banking regulation that has determined the specific data element as required in order to satisfy a specific provision of the banking regulation.

30. The computer storage medium of claim 21, wherein the data model provides information associated with each data element, the information comprising a semantic for the data element, a relationship to a particular section of an operational regulation, and textual documentation related to the use of the data element within the financial institution.

* * * * *